April 14, 1942.  E. E. HENSLEY  2,279,751
REAR VIEW MIRROR
Filed Sept. 14, 1940   2 Sheets-Sheet 1
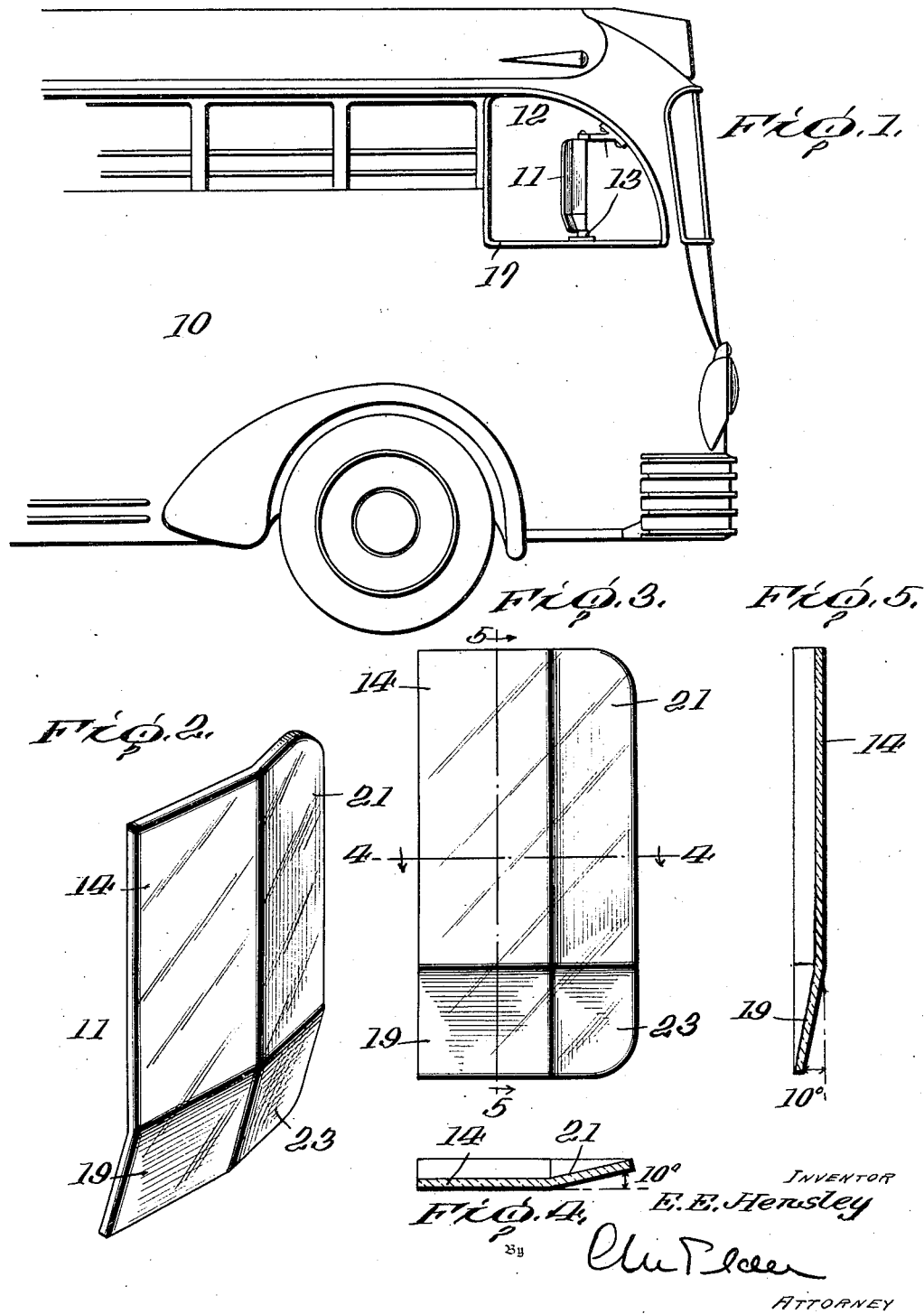

April 14, 1942.  E. E. HENSLEY  2,279,751
REAR VIEW MIRROR
Filed Sept. 14, 1940  2 Sheets-Sheet 2
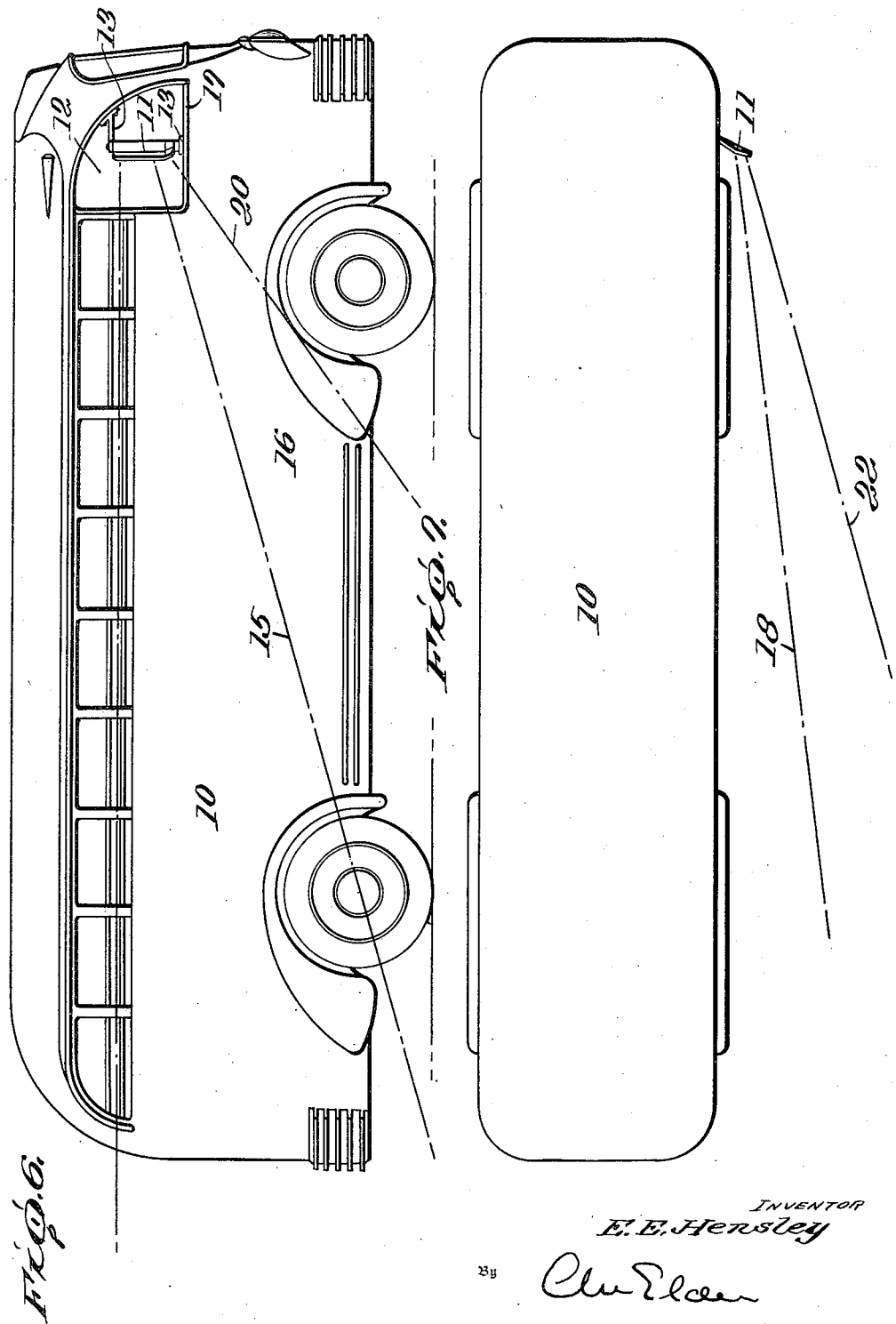
INVENTOR
E. E. Hensley
By
ATTORNEY Patented Apr. 14, 1942

2,279,751

UNITED STATES PATENT OFFICE 2,279,751

REAR VIEW MIRROR

Ernest Elwood Hensley, Verona, Va.

Application September 14, 1940, Serial No. 356,750

1 Claim. (Cl. 88—87)

My invention relates to mirrors, and more particularly concerns rear view mirrors adapted especially for use with motor vehicles of considerable length and having high cabs; together with the combination of a motor vehicle with such a mirror.

An object of my invention, therefore, is to produce a simple, sturdy, thoroughly reliable and efficient rear view mirror, economical of production and readily installed, which mirror will facilitate turning and otherwise manipulating the motor vehicle on which it is installed even in heavy traffic, all with full vision of traffic ranging alongside the vehicle; and which mirror will permit substantially full vision along both sides of the vehicle, particularly near the middle and front thereof, even in those cases where the cab of the vehicle is comparatively high off the ground, and where the vehicle has considerable length, the mirror thus substantially eliminating the presence of blind spots; the mirror being characterized by its production of a clear, undistorted image.

Another object is to produce such a rear view mirror having a greatly increased lateral field of view as compared to mirrors currently in use, so that the driver is provided a clear view of a wide extent of road.

Another object is to produce the combination of such a mirror with a motor vehicle of considerable length, particularly a vehicle having the driver's cab high off the ground, to facilitate turning and otherwise manipulating the vehicle, with full view afforded the driver of traffic conditions alongside and to the rear of the vehicle.

Other objects and advantages will in part be obvious and in part pointed out hereinafter.

In connection with the following, more detailed description of my invention, reference is had to the accompanying drawings, wherein:

Figure 1 is a fragmentary elevation of a motor vehicle equipped with a mirror according to my invention. Figure 2 is a perspective view and Figure 3 a front elevation of my new mirror, while Figures 4 and 5 are sectional views, taken respectively along lines 4—4 and 5—5 of Figure 3. Figures 6 and 7 are respectively an elevation and a plan view of a motor vehicle equipped with my invention, and depicting the increased range of vision obtainable therewith.

As conducive to a more thorough understanding of my invention, it may be pointed out at this time that drivers of motor vehicles of long wheel base have in the past experienced considerable difficulty while maneuvering in traffic, pulling into and away from the curb at regularly scheduled or intermittent stops, to discharge or take on passengers, freight and the like, or in making turns, in observing and avoiding traffic ranging alongside, pedestrians, or other obstacles. Particularly are these difficulties emphasized where the driver's compartment is disposed high off the ground, as in the modern day passenger bus, for example; and especially are these difficulties encountered when the bus is being turned towards the right.

More and more the industry appears to be turning to the use of both trucks and passenger buses in which the drivers' cabs are disposed high on the vehicle, giving rise to special problems, the solutions of which are requisite to guard against the use of such vehicles resulting in special hazards. The height of the driver's seat, and the width and length of the vehicle which he is driving, frequently combine in the production of a blind spot along each side of the vehicle. While these blind spots extend along both sides of the vehicle, it is more pronounced on the side opposite the driver, i. e. usually on the right side of the vehicle, since customarily the driver sits at the left of the cab. One factor contributing to the increased importance of the blind spot on the right side is that the driver, while his view through the mirror is supplemented to some extent by direct visualization at the left side of the cab, is deprived of such direct view at the right side of the cab. Thus, my invention assumes particular importance as concerns the right side of the vehicles having the controlling mechanism disposed in the customary positions.

It becomes apparent, upon consideration, that in turning a vehicle of some length to the right, with the driver seated at the left side of the vehicle, there exists a strong likelihood that a blind spot will be produced, of important dimensions, along the right side of the vehicle. It is equally apparent that cars, pedestrians, or other objects, either moving or stationary, may be located in that blind spot. The top of the ordinary passenger car does not extend as high as the bottom of the window in the door of the cab of vehicles under discussion, so that it is quite possible for such passenger vehicle to be entirely concealed in such blind spot. It frequently happens, therefore, that after a driver has made what he considers to be a careful survey of instant traffic conditions, the subsequent lateral movement of his vehicle results in a collision with an obstacle which all the while was located in the said blind spot, and concerning which the driver's alertness was unavailing.

Some attempt has been made to overcome this difficulty, and to remove this blind spot. Thus, workers in the art have resorted to the use of inside mirrors, having convex or concave reflecting surfaces, or various combinations thereof. It has also been proposed to provide the usual inside mirror with a hinged wing, pivotal through either of two planes at right angles to each other. All inside mirrors, however, possess in common the serious defect that they signally fail to disclose road conditions at the side of the vehicle, this blind spot extending practically the entire length of the vehicle, a condition which as has already been mentioned, is especially undesirable where the vehicle is long. Additionally, the non-planar mirrors which have been described produce distorted images, and result in confusion as to the actual distance of the object from the mirror. For all practical purposes, the use of inside mirrors has been discarded in the case of motor vehicles of any important length.

Additional work has been carried out with the use of outside mirrors, both planar and convex, disposed on both sides of the vehicle. Thus it is customary practice in the present-day Greyhound passenger buses, for example, where the driver sits high off the road, on the left side of the bus, to provide outside planar mirrors on both the right and left doors of the vehicle. To a certain extent, therefore, the driver can see along the sides of the bus. This, however, is but a partial solution of the problem, for even in the cited instance, a long region exists, particularly along the right side of the bus opposite the driver, in which it is impossible for the driver to see. This region extends from the door of the vehicle rearwardly from the vertical plane of the mirror and at about the bottom window level of the door of the bus, slantingly downward to about the rear end of the vehicle. It is quite possible, therefore, for a car of the usual length and height, such as the conventional passenger car, to come alongside the vehicle under discussion, for example while the latter is stopped at a traffic signal, and be effectually concealed in the aforementioned blind spot, the motor noise, traffic sounds, etc., effectively obscuring the noise of approaching passenger car. In such an instance, despite an earnest endeavor on the part of the driver to make a proper observation before pulling laterally to see the obstruction ranging alongside; and any such effort towards lateral movement will quite likely result in collision. It is unavailing to attempt to solve the problem simply by depressing a planar mirror out of a vertical plane, for by so doing the range of the rearward view is curtailed drastically, defeating the primary objective of such mirrors.

It is a further object of my invention, therefore, to produce a rear-view mirror for use in motor vehicles, and the combination of such rearview mirror with a motor vehicle having a high cab and a long wheel base, which will avoid the aforementioned disadvantages and which will remove any blind spots along either side of such motor vehicle, and by the use of which, the driver, seated high in his cab, nevertheless is afforded an unobstructed view along the sides of his vehicle, throughout its height from the level of the mirror to the ground, and throughout the entire length of the vehicle, from the door of the cab to the tail of the body. Thus the driver may make turns in either direction with facility, surety and precision; and whether making full ninety degree turns or simply pulling into or away from the curb, the driver can ascertain at all times precisely what impediments, if any, are ranged alongside his vehicle. Additionally, he can determine exactly where his vehicle is with respect to the berm of the road.

A further difficulty in connection with the use of rear view mirrors such as are in current use is that the lateral field of vision is extremely limited. Thus, in pulling into curbs, making turns, and the like, it is impossible to observe through the mirrors, to any considerable extent to either side of the vehicle. This difficulty is not so important on the driver's side of the cab, where the driver can make a direct observation. It is much more serious, however, on the opposite side of the cab, where reliance must be placed entirely on the mirror. Thus, for example, where a bus driver is pulling into a curb, it is practically impossible for him to see the curb when a mirror of usual construction is employed. Again, when he is making a right turn, let us say, it is necessary for him first to pull his vehicle, if it have any considerable length, to the left, away from the turn, and then to the right, into the turn. Because of this first pull to the left, it is quite possible that at busy intersections for example, traffic in several lanes may have pulled alongside to the right, before the turn is reversed, from left to right. With the limited field of vision permitted by the known mirrors, the traffic beyond the first lane is not visible through the mirror, at the time that such reversal of direction is initiated, and it is not until the vehicle is well into its turn that the second and other lanes of traffic are visible through the mirror. It may be noted at this time that the ordinary plane mirrors currently in use give a lateral field of about three feet width.

Considerable effort has been directed to increasing the lateral field of vision of the driver particularly on the right, or remote side of a vehicle having a left-hand drive. To this end, an outside mirror having a convex target has been provided. This mirror, however, soon went out of any wide-spread use, because of the highly distorted images which were reflected to the eyes of the driver. A still further object of my invention, therefore, is to eliminate in large measure the likelihood of accident resulting from limited sidewise vision of the driver of a motor vehicle, and to develop a mirror which will increase materially the clear, undistorted lateral field of vision of the driver of a vehicle equipped with such mirror.

Referring more particularly to the disclosure of the drawings, the front part of a motor vehicle such as a passenger bus is indicated at 10, equipped with an outside rear view mirror 11 according to my invention. It is to be noted that this vehicle, whether it be a modern-day high cab passenger bus, a cab-over-engine truck, or other truck with high cab, is characterized by the fact that the driver's compartment 12 is disposed high off the ground. It is readily seen, therefore, that the driver, seated at the left side of such compartment or cab, will have no view of the right side of his vehicle in the absence of a suitable rear view mirror at the right side of the vehicle, and that additionally, the provision of a rear view mirror along the left side of his cab will greatly facilitate his view along that side of the vehicle. I contemplate, therefore, the provision of my new mirror at each side of the vehicle.

The installation of the conventional mirror will not of itself, however, provide full and adequate view along the sides of the vehicle, and it is for that reason that I have evolved my new mirror, which affords complete vision along that side of the vehicle on which it is installed.

The mirror itself, which may be mounted in suitable fashion at the side of the cab of the vehicle, preferably at the window thereof, as by brackets 13, is more particularly described with reference to Figures 2 through 5, inclusive.

The mirror comprises a central portion 14, which in use is mounted substantially vertically. This central portion, about five inches wide, is substantially equivalent to the conventional outside mirror as now in widespread use. It possesses the disadvantage, however, of limited field of vision, both laterally and longitudinally, as is best demonstrated, perhaps, in Figures 6 and 7. The bottom limit of the field of vision from the central portion 14, for example, is quite shallow, and is represented with fair accuracy by the line 15 in Figure 6. It is apparent that there is a considerable area 16, near the front of the vehicle, which with only the conventional mirror in use, is totally blind to the driver. Since the bottom 17 of the window 12 of the cab is above the top of the ordinary passenger vehicle, it will be appreciated that it is quite possible that a car may range alongside the vehicle, without any indication of that fact to the driver of the vehicle 10.

Similarly, the lateral field of vision of the central portion 14 is comparatively limited, say about three feet. The limit of this contracted field is indicated with fair accuracy by the line 18 in Figure 7, and since the field is divergent rearwardly from the mirror as a focal point, it will be appreciated that the lateral field is extremely limited near the front of the vehicle.

I have overcome the first of these two difficulties, and have increased the downward range of the longitudinal field of vision, by providing a bottom apron or skirt 19, formed integrally or otherwise attached to the bottom edge of the central portion 14, and preferably of substantially the same width. The reflecting surface of this bottom apron portion is disposed rearwardly and downwardly of the central, elongated portion, towards the front of the vehicle 10. This bottom apron portion of course can be arranged at any convenient and suitable angular relation with respect to the plane of the central portion 14. I have found, in practice, that when the bottom apron 19 and the central portion 14 are disposed at an angle of 10° relative to each other, a highly satisfactory result is obtained. With such bottom apron 19 in use, the downward limit of the longitudinal field of vision through the mirror 11 is greatly increased, and is represented with satisfactory accuracy in Figure 7 by the line 20. It will be seen that this line 20 falls through the forward part of the vehicle, and enlarges the driver's view of the region near the front of the vehicle to an extent that for all practical purposes, it is impossible for a car to range alongside the vehicle 10 and its presence be unknown to the driver looking through the mirror 11.

It has already been developed that with the central portion 14 of the mirror 11 alone, the lateral field of view at the side of the vehicle on which the mirror is mounted is extremely limited, and the field of vision indicated at 18 in Figure 7, is never more than about three feet. As has been discussed, this limited range of view occasions difficulties in starting the execution of turns, pulling laterally to the curbing, etc. To avoid these difficulties and to increase the field of view, I provide a side apron or skirt 21 formed integrally or otherwise secured to the outer side edge of the central portion 14 of the mirror 11. Such side apron or skirt may conveniently have a width of from two to three inches, and as shown, extends the full length of the central portion 14.

The reflecting surface of the side apron 21 is disposed rearwardly and outwardly from the reflecting surface of the central portion 14, towards the front of the vehicle, at any convenient angle relative to said central portion. I have found that extremely satisfactory results are obtained by disposing the side apron rearwardly at about 10° to the plane of the central portion, and that by so doing, the lateral range of view is increased from about three feet to about six or seven feet, as fully indicated by line 22 in Figure 7. This side apron thus greatly increases the view of the driver at the initiation of turning or other lateral movement of the vehicle, and substantially avoids the possibility of accident resulting from failure to observe the traffic or road conditions alongside the vehicle.

The corner portion 23, Figures 2 and 3, serves no particularly useful purpose, and may be removed or left remaining, as suits the convenience of the particular manufacturer. Because of possibility of multiple or distorted images, I prefer to remove to cover portion 23.

A vehicle equipped in accordance with my invention with a rear view mirror is characterized by the fact that regardless of the length of the vehicle or the height of its cab above the ground, the blind spot which has hitherto existed just below and to the rear of the mirror is for all practical purposes completely eliminated, and the driver can observe all traffic overtaking him, or creeping up alongside him.

Furthermore, the lateral field of vision is increased to such a considerable extent that he at all times has under observation traffic in rows which are removed by several traffic lanes from him.

For the first time, the driver has available a clear and undistorted image of the curb and other traffic impedimenta as he draws to either side of the road or prepares to make a turn either to the right or to the left. It is a great advantage for the driver of a vehicle of such size to see the curb as it is approached, for by this observation he can determine how much lateral movement of this vehicle is required. In the absence of such guiding means he is compelled to "feel" his vehicle into position, and may quite possibly strike the curb, with consequent damage to the front wheel assembly, or else fail to approach the curb sufficiently closely. The importance of these features of novelty is apparent when the growing tendency towards increasing the length of motor vehicles is considered.

Thus the avoidance of the blind spot is of great practical importance, and practically eliminates the host of minor, and occasional important accidents which result from the failure of the driver, through no fault of his, to observe what is at the side of his vehicle.

Whereas formerly, with the use of the conventional planar, outside mirror, the lateral field of vision was, as has been suggested, about three feet, my new mirror increases the field of vision to such an extent that a clear, undistorted view of from six to seven feet from the side of the vehicle is provided. On a short turn, this additional three to four feet view probably would represent the margin of difference between accident and safety.

Whereas, in the claim, I refer to the driver's cab as being disposed "high on the vehicle," I intend to denote a height equivalent to that in the present-day high cab passenger bus, or cab-over-engine truck.

I intend that the foregoing disclosure be considered solely by way of illustration, and not by way of limitation. The scope of the invention is to be limited only by the appended claim:

I claim:

A rear view mirror adapted for outside use in motor vehicle cabs, comprising an elongated central reflecting portion, adapted to be carried in substantially a vertical plane, and imaging the field for a considerable distance forwardly of said mirror, up to but short of the field just forward of said mirror, a bottom apron reflecting portion and a side apron reflecting portion, attached respectively to the bottom and one of the side edges of the central portion, and respectively perpendicularly of the major axis of the mirror, and parallel to said major axis, and both apron portions bent back at slight angles so that their respective reflecting surfaces extend rearwardly away from the plane of the elongated portion, each said reflecting portion producing a separate, planar image.

ERNEST ELWOOD HENSLEY.